UNITED STATES PATENT OFFICE.

ERNST NIENSTÄDT, OF BERLIN, GERMANY.

ETCHING GLASS.

SPECIFICATION forming part of Letters Patent No. 273,588, dated March 6, 1883.

Application filed October 31, 1882. (No specimens.) Patented in Germany January 22, 1881, No. 15,590; in Belgium February 22, 1881, No. 53,907, and in France February 24, 1881, No. 141,334.

*To all whom it may concern:*

Be it known that I, ERNST NIENSTÄDT, a subject of the Duke of Brunswick, residing at Berlin, in the Kingdom of Prussia, German Empire, have invented certain new and useful Improvements in Etching Glass, (for which I have obtained Letters Patent in the German Empire, dated January 22, 1881; in Belgium, No. 53,907, dated February 22, 1881, and in France, No. 141,334, dated February 24, 1881;) and I do hereby declare that the following is a full, clear, and exact description of the invention, which will enable others skilled in the art to which it appertains to make and use the same.

My invention relates to improvements in etching glass—that is, in the method of providing and embellishing the glass with any designs of a deadened non-translucent surface.

The sole process heretofore known and used of chemically etching glass consisted in the use of fluoric acid, which is well known to be very fatal to the health of the operator.

The object of my invention, therefore, is to provide a chemical corrosive which may easily be applied, and which perfectly obviates the danger inseparably connected with the use of fluoric acid.

Instead of the fluoric acid hitherto exclusively employed for the chemical etching of glass, I use only the fluorides (fluates) in a dry state, which never develop the dangerous vapors of the acid.

To carry my invention into effect, the said fluates are brought upon the glass to be etched by means of a suitable gluten, such as arabic troches, gum of any kind, gum-lac, and other lacs of vegetable resins, dextrine, starch, glycerine, varnish, oil-varnish, and any other glutens of similar kind. The said gluten is preferably transferred first to the glass by suitable means in the exact design to be etched, and the fluate then powdered upon the gluten in a finely-pulverized state; but the powder of fluate may as well be mixed with the gluten previous to its being applied to the glass, the paste thus obtained being used as a color.

For the purposes of my invention I prefer to use fluoride (fluate) of ammonium; but I may use fluoride (fluate) of potassium, fluoride (fluate) of sodium, or any other fluorides (fluates) which will by their hygroscopic property attract the humidity of the atmosphere, and thereby receive the corrosive quality which enables them to etch the glass as required.

With this process any printing and stamping operation, types, rubber stamps, and the like may be employed for fixing upon the glass any convenient figures or letters or designs to be etched; or such designs may as well be drawn by hand or through a templet. By these means my invention allows of a vast variety of ornaments and embellishments being etched in an easy manner upon glass of any kind.

Having thus fully described my invention and how it may be carried into practice, what I claim, and wish to secure by Letters Patent, is—

The process of etching glass and similar substances of any kind—enamel, porcelain, and the like—by the use of fluorides (fluates) in a dry state, in combination with a suitable gluten, substantially as set forth.

In testimony whereof I have signed my name to this specification in the presence of two subscribing witnesses.

ERNST NIENSTÄDT.

Witnesses:
OTHMAR LENZ,
CARL NEUER.